Figure 1:
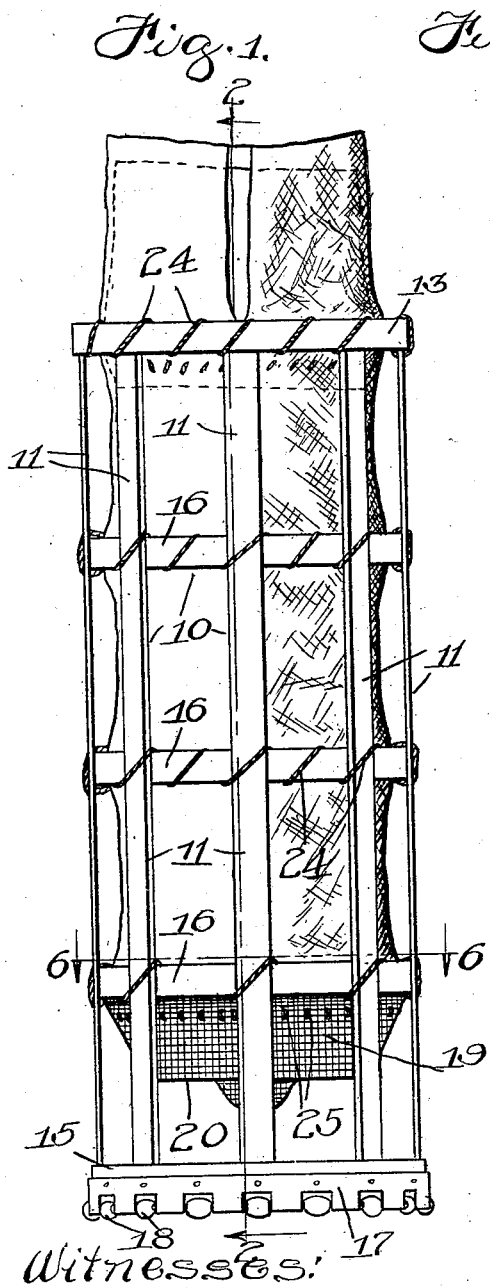

No. 880,702. PATENTED MAR. 3, 1908.
C. A. WELLMAN.
BANANA SHIPPING CASE.
APPLICATION FILED JUNE 11, 1906.

2 SHEETS—SHEET 1.

Witnesses:
J. B. Weir
W. P. Kilroy

Inventor:
Charles A. Wellman,
by Bond Adams Pickard Jackson
his Attys.

No. 880,702. PATENTED MAR. 3, 1908.
C. A. WELLMAN.
BANANA SHIPPING CASE.
APPLICATION FILED JUNE 11, 1906.

2 SHEETS—SHEET 2.

Witnesses
J. B. Weir
W. P. Kilroy

Inventor
Charles A. Wellman,
by Bond Adams Pickard Jackson,
his Attys.

UNITED STATES PATENT OFFICE.

CHARLES A. WELLMAN, OF OTTUMWA, IOWA.

BANANA-SHIPPING CASE.

No. 880,702.  Specification of Letters Patent.  Patented March 3, 1908.

Application filed June 11, 1906. Serial No. 321,255.

*To all whom it may concern:*

Be it known that I, CHARLES A. WELLMAN, a citizen of the United States, residing at Ottumwa, in the county of Wapello, State of Iowa, have invented certain new and useful Improvements in Banana-Shipping Cases, of which the following is a specification, reference being had to the accompanying drawings.

This invention relates to improvements in banana shipping cases, and has for its object to provide a new and improved support for the fruit in the case.

Heretofore, the bag which contains the fruit and which is secured within and out of contact with the outer crate has generally been made of cloth, and the bottom portion has been given the shape of a hollow inverted cone. When a bunch of bananas is placed in such a bag, the stem of the bunch rests in the apex of the cone, and the weight of the fruit is such that the stem wears a hole through the cloth in a comparatively short time, especially if the case is roughly handled. Moreover, the apex of the conical end portion is centrally disposed with relation to the cylindrical bag. This, of course, is very satisfactory if the stem of the bunch of bananas is straight from end to end, but when a bunch with a stem curved to any considerable degree is placed in the bag, some little force is required for getting the bunch into position with the stem in the apex of the cone where it will sustain the weight of the fruit and be held firmly in place. This forcing of the fruit into the bag either changes the shape of the bunch—in which strained position it is held as long as it remains in the bag—with great consequent damage to the fruit, or it forces the bag out of shape, often allowing the fruit to come in contact with the outer crate. To avoid these difficulties, I have provided an independent support of metal or other suitable material, so formed and so combined with the remaining parts of the case that the weight of the bunch of bananas will be sustained by the stem and the bunch itself securely held in position without its having any undue force used upon it.

Another object of my invention is to provide a new and improved means for effectually closing the top of the bag. It has been customary to employ a bag somewhat longer than an ordinary bunch of bananas, and the bag has generally been split longitudinally at one side for a short distance from the top, so that the top of the bag could be turned down out of the way, in order to facilitate putting in or taking out the fruit. When the bunch of fruit had been put into the bag, its top portion was simply gathered together and tied with a cord, or otherwise suitably secured. This, however, always leaves an opening in the top of the bag, through which one's hand can be readily inserted and quickly withdrawn with one or more bananas. This can be done so quickly that it is difficult to detect the guilty party, and is often a source of considerable loss in the shipment of bananas. My improved closure is provided to prevent this furtive taking of fruit, as well as better to protect the fruit itself.

Another object of my invention is to improve the construction of cases of this class in various details hereinafter pointed out.

I accomplish these objects by the means shown in the accompanying drawings, and hereinafter specifically described. What I believe to be new will be pointed out in the claims.

Figure 2:
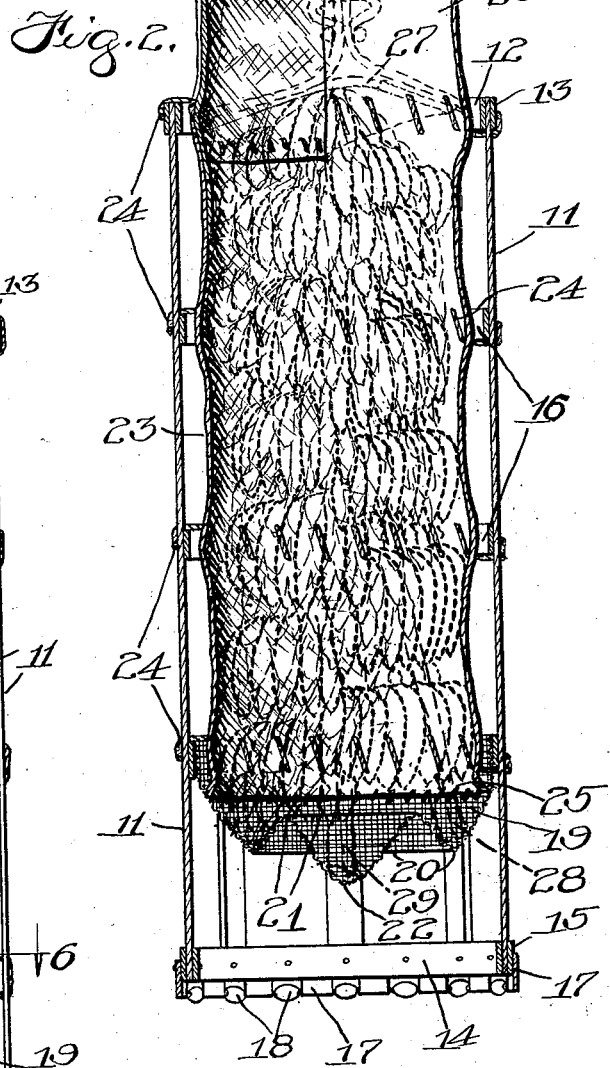
Figure 3:
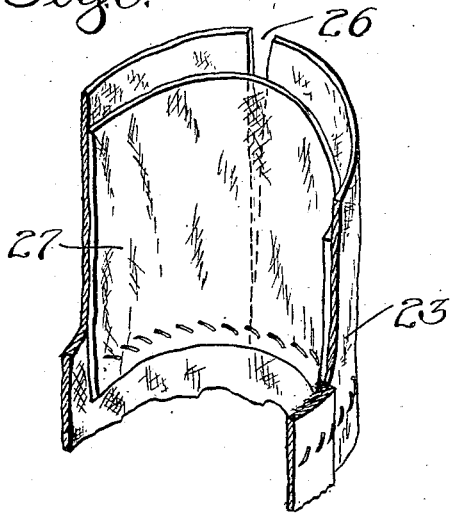
Figure 4:
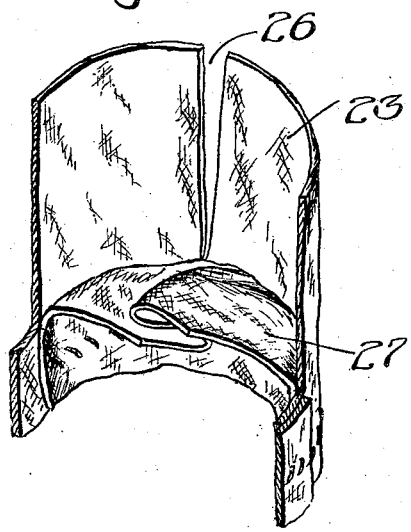
Figure 5:
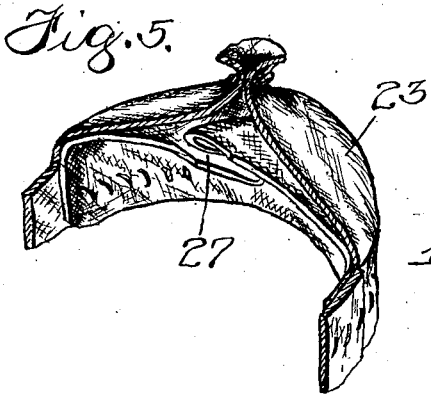
Figure 6:
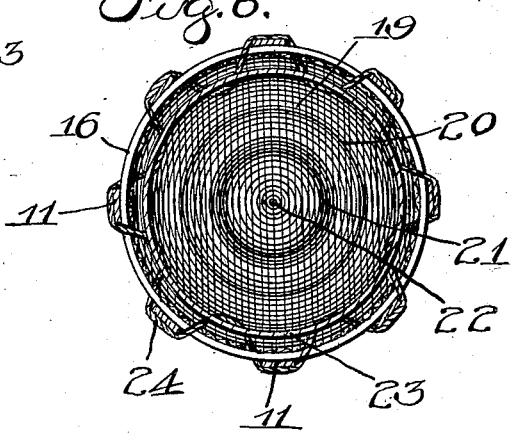

In the drawings:—Figure 1 is a side elevation of my improved case. Fig. 2 is a section taken at line 2 2 of Fig. 1, showing also in dotted lines a bunch of fruit in position. Fig. 3 is a perspective view of the top portion of the bag, with one side of the bag cut away. Fig. 4 is a view similar to that of Fig. 3, but showing the flap folded down. Fig. 5 is a view similar to that of Fig. 4, but showing the end of the bag gathered and tied. Fig. 6 is a section taken at line 6 6 of Fig. 1.

Referring to the drawings, in which corresponding reference numerals indicate like parts, 10 indicates the frame of an ordinary banana shipping case, comprising the longitudinal slats 11, inner and outer hoops 12 and 13 at the top, inner and outer hoops 14 and 15 at the bottom, intermediate inner hoops 16, and metal band 17 carrying rollers 18, the parts being suitably connected together in any well-known manner.

19 indicates a support secured to the inside of the lowermost intermediate hoop 16 by means of staples, or in any other suitable manner, for holding in position a bunch of bananas. As shown in Figs. 2 and 6, this support 19 extends downward and inward from the lowermost hoop 16 to a point 20, thence upward and inward to a point 21, and thence downward and inward again to the central point 22. This support is preferably made of very stiff wire-netting swaged into the shape indicated, but it may be shaped out of other suitable material, or it may be cast in the required shape.

23 indicates a bag which is secured inside the frame 10 by means of cords 24 which pass through the cloth of the bag and around the hoops and slats, as indicated in Figs. 1, 2 and 6. Inasmuch as the diameter of the bag is less than the inside diameter of the hoops 12 and 16, when the cords 24 are drawn tight and tied the bag 23 will be held away from the frame 10 at all points.

As shown in Figs. 2 and 6, the bottom of the bag is secured at all points to the support 19 a short distance below the point where the support is secured to the lowermost hoop 16. I have shown it as being stitched to said support by means of cord 25, but it may be otherwise suitably secured thereto.

As shown in Figs. 1 and 2, the bag 23 when extended reaches some distance above the frame 10. To enable this top portion of the bag to be turned down out of the way in order to put in or take out a bunch of bananas, a longitudinal slit 26 is made in the top of the bag down to the hoops 12 and 13. To effectually close this opening when the top of the bag is tied in the usual manner, a flap 27 is provided, which is stitched to the bag, as shown, at a point about opposite the top of the frame 10, or otherwise suitably secured in position. It is evident that this flap can also be readily turned down outside the frame to enable one to readily put in or take out a bunch of bananas.

In Fig. 2, a bunch of bananas is shown in dotted lines in position in the case. 28 indicates the lower end of the stem of a curved bunch of bananas, which end is accordingly made to rest in the annular channel formed in the support 19 as above described, thus supporting it without having to straighten the stem with the consequent liability to damage the fruit, and at the same time keeping the bunch, as a whole, approximately in the center of the case where it must be to avoid damage in handling. 29 indicates the lower end of the stem of a straight bunch of bananas, the end 29 being placed in the central conical depression and thus insuring the bunch as a whole being held in the center of the case. This support 19 is made of stiff material, and affords a very stable means for holding the bunch of bananas in place.

After the bunch of bananas has been placed in the case, the flap 27 is folded down over them and the top of the bag tied, all as shown in dotted lines in Fig. 2. This is shown more in detail in Figs. 4 and 5. It is evident that the flap 27 effectually closes the opening 26, rendering it practically impossible to take out bananas without unfastening the cord at the top of the bag, which of course would consume so much time that it could not usually be done without detection.

What I claim as my invention and desire to secure by Letters Patent is:—

1. In a banana shipping case, the combination of a crate, means within said crate near its lower end adapted to support in any of a plurality of positions the end of the stem of a bunch of bananas, and a bag distended and secured within said crate above said supporting means.

2. In a banana shipping case, the combination of a crate, a rigid support secured within said crate near its lower end, said support having a plurality of depressions each adapted to receive and hold in place the end of the stem of a bunch of bananas, and a bag distended and secured within said crate.

3. In a banana shipping case, the combination of a crate, a rigid support secured within said crate near its lower end, said support having a central conical depression and an outer concentric depression, and a bag distended and secured within said crate above said support.

4. In a banana shipping case, the combination of a crate, a wire-netting support secured within said crate near its lower end, said support being shaped to have a conical depression and an outer concentric depression, and a bag distended and secured within said crate.

CHARLES A. WELLMAN.

Witnesses:
　A. L. BUTTON.
　E. C. HAMMOND.